United States Patent
De Atley et al.

(10) Patent No.: US 8,682,308 B2
(45) Date of Patent: Mar. 25, 2014

(54) OVER-THE-AIR DEVICE CONFIGURATION

(75) Inventors: Dallas De Atley, San Francisco, CA (US); Arun G. Mathias, Cupertino, CA (US); George R. Dicker, Cupertino, CA (US); Jerry Hauck, Windermere, FL (US); Cherif Jazra, Los Altos, CA (US); Andre Boule, San Jose, CA (US)

(73) Assignee: Apple Inc., Cupertino, CA (US)

( * ) Notice: Subject to any disclaimer, the term of this patent is extended or adjusted under 35 U.S.C. 154(b) by 29 days.

(21) Appl. No.: 13/487,052

(22) Filed: Jun. 1, 2012

(65) Prior Publication Data

US 2012/0309377 A1    Dec. 6, 2012

Related U.S. Application Data

(60) Provisional application No. 61/493,406, filed on Jun. 3, 2011.

(51) Int. Cl.
    *H04M 3/00*    (2006.01)

(52) U.S. Cl.
    USPC ............................ 455/418; 455/419; 455/411

(58) Field of Classification Search
    USPC .......................................... 455/418, 419, 411
    See application file for complete search history.

(56) References Cited

U.S. PATENT DOCUMENTS

| | | | |
|---|---|---|---|
| 6,529,727 B1 * | 3/2003 | Findikli et al. | 455/411 |
| 8,095,132 B2 * | 1/2012 | Cheng et al. | 455/435.1 |
| 8,170,528 B2 * | 5/2012 | Montz et al. | 455/410 |
| 2004/0092248 A1 * | 5/2004 | Kelkar et al. | 455/411 |
| 2007/0015538 A1 | 1/2007 | Wang | |
| 2008/0228901 A1 * | 9/2008 | Choi et al. | 709/220 |
| 2009/0196285 A1 | 8/2009 | Smires et al. | |
| 2010/0029331 A1 * | 2/2010 | Gnuschke | 455/558 |
| 2011/0087757 A1 | 4/2011 | Paalanen et al. | |
| 2011/0159843 A1 * | 6/2011 | Heath et al. | 455/411 |

FOREIGN PATENT DOCUMENTS

| | | |
|---|---|---|
| EP | 1763266 A1 | 3/2007 |
| WO | 03079216 A1 | 9/2003 |
| WO | 2008092855 A1 | 8/2008 |

* cited by examiner

*Primary Examiner* — Kwasi Karikari
(74) *Attorney, Agent, or Firm* — Park, Vaughan, Fleming & Dowler LLP (57) ABSTRACT

Methods, program products, and systems of over-the-air device configuration are disclosed. In general, in one aspect, a mobile device can determine, in an application subsystem of the mobile device, that the mobile device requests an initial setup. The application subsystem can send a request to a baseband subsystem of the mobile device. The request can include an indicator specifying that the baseband subsystem is to operate in a service configuration mode. The mobile device can request the configuration information from a registration server using the baseband subsystem that operates under the service configuration mode. Requesting the configuration information from the server can include connecting to the server over the air using a cellular network, through a specified carrier and under a specified data transfer cap. The mobile device can then configure the mobile device using configuration information received from the server.

28 Claims, 8 Drawing Sheets

OVER-THE-AIR DEVICE CONFIGURATION

CROSS-REFERENCE TO RELATED APPLICATIONS

Under 35 U.S.C. §119, this application claims benefit of pending U.S. Provisional Application Ser. No. 61/493,406, filed Jun. 3, 2011, the entire contents of which are hereby incorporated by reference.

TECHNICAL FIELD

This disclosure relates generally to configuring wireless devices.

BACKGROUND

A wireless mobile device, when first sold or after a data purge, may be a raw device without configuration information. A user of the device can perform an initial setup of the device before a first use. The initial setup can include connecting to a registration server and registering the device with the registration server. The device can receive various certificates from the registration server upon registration. Using the certificates, the device can perform various setup tasks such as designating a cellular carrier, creating a network identity, registering at online stores, among others. At setup time, the device may not yet have an account known to a cellular carrier. Accordingly, to connect to the registration server, the device can use a wired connection, for example through a universal serial bus (USB) cable to a wired or wireless device that is connected to the registration server. The device can also attempt to connect to the registration server through an open wireless network

SUMMARY

Methods, program products, and systems of over-the-air device configuration are disclosed. In general, in one aspect, a mobile device can determine, in an application subsystem of the mobile device, that the mobile device requests an initial setup. The application subsystem can send a request to a baseband subsystem of the mobile device. The request can include an indicator specifying that the baseband subsystem is to operate in a service configuration mode. The mobile device can request the configuration information from a registration server using the baseband subsystem that operates under the service configuration mode. Requesting the configuration information from the server can include connecting to the server over the air using a cellular network, through a specified carrier and under a specified data transfer cap. The mobile device can then configure the mobile device using configuration information received from the server.

In some implementations, a mobile device can automatically set up a default language. During an initial setup, the mobile device can detect one or more wireless access devices (e.g., cellular towers or wireless access points or both). The mobile device can identify a country code of the wireless access devices. The mobile device can identify a language from a language data store using the identified country code of the wireless access devices. The mobile device can designate the identified language as a default language of the mobile device.

The techniques described in this specification can be implemented to achieve the following advantages. During an initial setup of a mobile device, the mobile device can access a registration server through a cellular communications network when a wired connection or an open connection to a wireless access point is unavailable. Thus, comparing to a conventional mobile device, a mobile device implementing the techniques described in this specification can have more freedom as to when and where to register.

The mobile device can automatically identify a default language. Language selection by a user may be inconvenient when a mobile device is in a foreign country, a user of the device is unfamiliar with the language of the country, or language selection is several menus deep. A device implementing the techniques described in this specification can set a default language using automatically detected wireless or cellular signals without user intervention or with minimum user intervention. Thus, compared to a conventional mobile device, user confusion can be reduced.

The details of one or more implementations of over-the-air device configuration are set forth in the accompanying drawings and the description below. Other features, aspects, and advantages of over-the-air device configuration will become apparent from the description, the drawings, and the claims.

BRIEF DESCRIPTION OF THE DRAWINGS

Like reference symbols in the various drawings indicate like elements.

DETAILED DESCRIPTION

Overview of Over-the-Air Device Configuration

Figure 1:
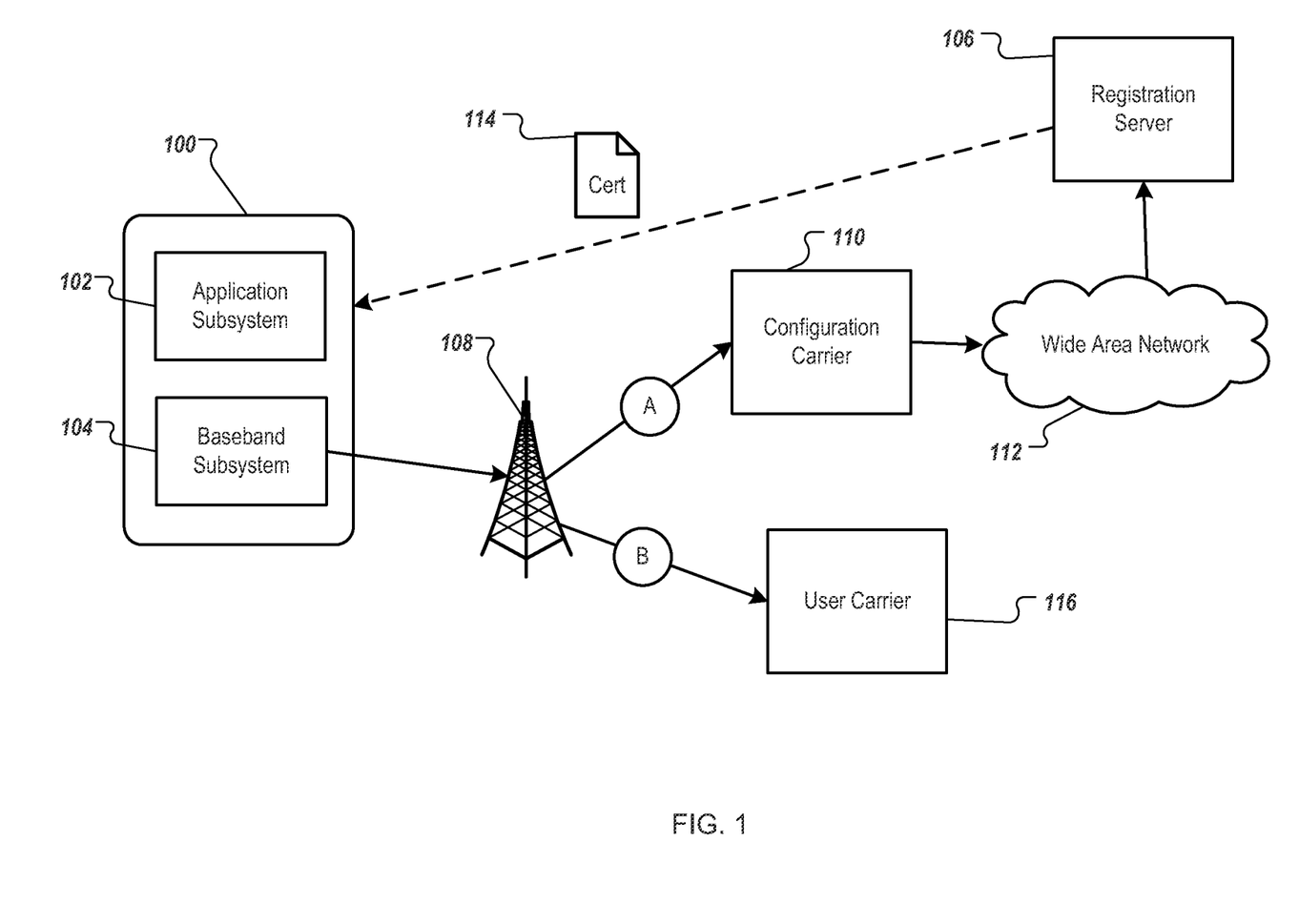
FIG. 1 is a block diagram providing an overview of exemplary techniques of over-the-air device configuration.

FIG. 1 is a block diagram providing an overview of exemplary techniques of over-the-air device configuration. Mobile device 100 is an exemplary mobile device that is in a raw mode. For example, mobile device 100 can be a new device that has not been activated or a device on which configuration information has been erased. Mobile device 100 can receive a request from a user to activate the device.

Mobile device 100 can include application subsystem 102 and baseband subsystem 104. Application subsystem 102 is a component of mobile device that is configured to perform operations that are conventionally performed by a computer. These operations can include, for example, executing an application program, storing various data, and displaying multimedia content.

When mobile device 100 receives the request to activate the device, a configuration program can execute in application subsystem 102. Execution of the configuration program can cause mobile device 100 to identify registration server 106 and register at registration server 106. Mobile device 100 can search for a wired connection (e.g., a USB connection) or an open wireless connection (e.g., a Wi-Fi™) that does not require a user name or password. In some implementations, mobile device can connect to registration server 106 using such a connection. In some implementations, mobile device 100 can attempt to establish a connection to registration server 106 using baseband subsystem 104.

Baseband subsystem 104 of mobile device 100 can be a component of mobile device 100 that is configured to perform operations that are conventionally performed by a cellular transceiver. These operations can include, for example, initiating or receiving a telephone call, and transmitting or receiving data through a cellular network. Baseband subsystem 104 of mobile device 100 can be configured to operate in a normal mode or in a service configuration mode. In the normal mode, baseband subsystem 104 can communicate with a cellular network at full capacity. In the service configuration mode, baseband subsystem 104 can communicate with a cellular network under a specified capacity and using a designated cellular carrier.

During configuration of mobile device 100, application subsystem 102 can request baseband subsystem 104 to operate under the service configuration mode. The request can be associated with an identifier of the carrier and a specification of the capacity. In response, baseband subsystem 104 can detect cell tower 108. Mobile device 100 can connect to the designated cellular carrier using connection A. The designated carrier can be configuration carrier 110. Through system operating parameters, configuration carrier 110 can allow mobile device 100 to access communications network 112 even when mobile device 100 is unknown to configuration carrier 110 when certain conditions are satisfied. These conditions can include, for example, (1) data transfer between mobile device 100 and servers on communications network 112 does not exceed the specified capacity (by bit rate or by total amount of data), or (2) the data transfer is between mobile device 100 and one or more designated servers, or (3) both (1) and (2) above.

Baseband subsystem 104 is configured to connect to configuration carrier 110 and communicate at a capacity under the specified capacity. Accordingly, mobile device 100 receives permission to connect to communications network 112. Mobile device 100 can access registration server 106 through communications network 112. Mobile device 100 can provide a device identifier to registration server 106 and receive, through communications network 112 and configuration carrier 110, one or more certificates 114. Using the certificates 114 from registration server 106, mobile device 100 can perform the initial activation. The initial activation can include, for example, attaching mobile device to a cellular carrier. The cellular carrier can be configuration carrier 110 or another carrier (e.g., user carrier 116). Baseband subsystem 104 can connect to the cellular carrier using another connection (e.g., connection B) in the normal operating mode.

Exemplary System Components

Figure 2:
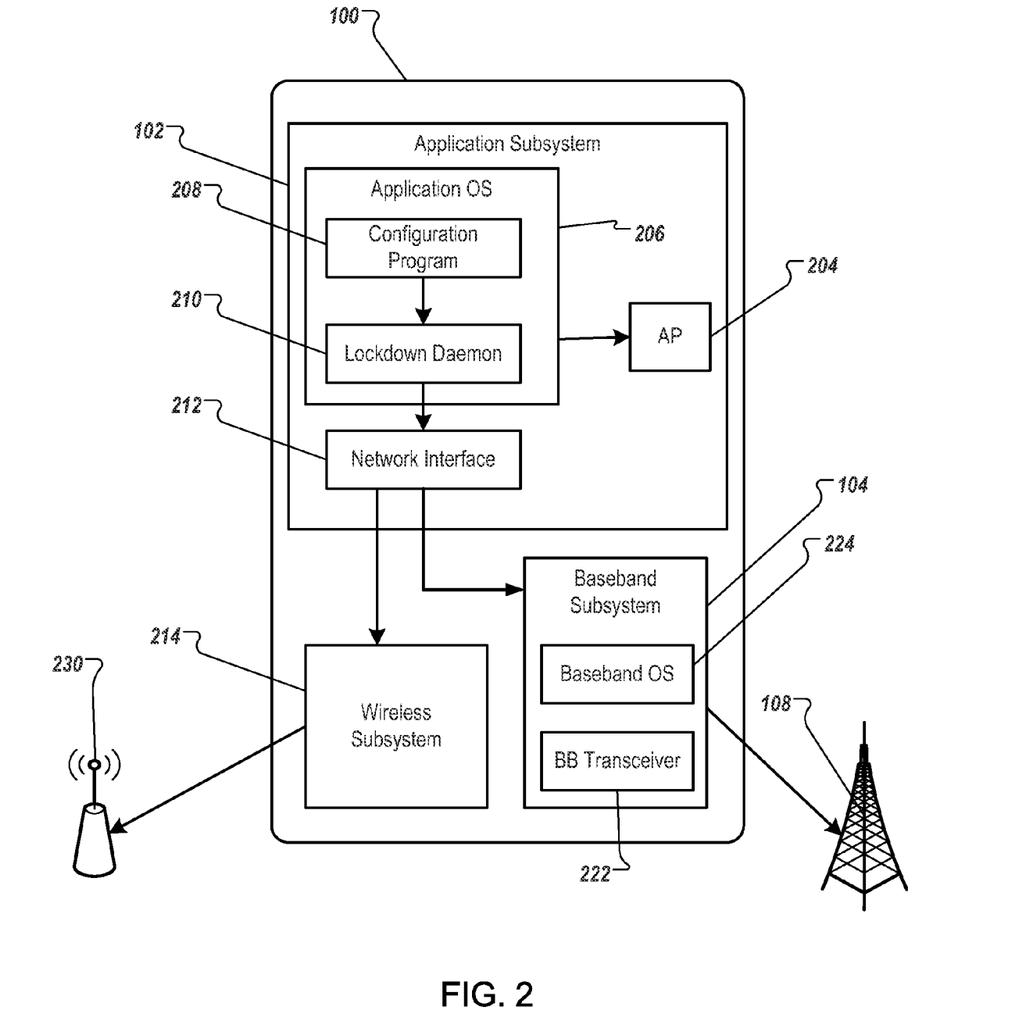
FIG. 2 is a block diagram illustrating functional components of an exemplary system of over-the-air device configuration.

FIG. 2 is a block diagram illustrating functional components of an exemplary system of over-the-air device configuration. The system can include mobile device 100 as described above in reference to FIG. 1.

Mobile device 100 can include application subsystem 102. Application subsystem 102 can include application processor 204 and application operating system 206. Application operating system 206 can include programs and data configured to manage application processor 204 and other resources and provide services to one or more application programs.

Configuration program 208 can execute in application operating system 206. Configuration program 208 can include instructions that, upon execution, can cause application processor 204 to determine whether mobile device 100 is in an activation mode. If mobile device 100 is in an activation mode, configuration program 208 can cause application processor 204 to perform system configuration operations.

During the system configuration operations, configuration program 208 can communicate with lockdown daemon 210. Lockdown daemon 210 can include instructions for determining what device can access mobile device 100 and what device or service mobile device 100 can access.

Application subsystem 102 can include network interface 212. Network interface 212 can include hardware, software, or firmware components configured to enable communication between application subsystem 102 and other subsystems of mobile device 100. These subsystems can include baseband subsystem 104 and wireless subsystem 214.

Baseband subsystem 104 can include a baseband transceiver 222 and baseband operating system 224. Baseband transceiver 222 is a component of baseband subsystem 104 that is configured to send or receive a cellular signal from cell tower 108. Baseband operating system 224 can include programs and data configured to manage baseband transceiver 222 and other resources. For example, baseband operating system 224 can specify which cellular carrier baseband transceiver 222 can connect to, and at what capacity. Baseband subsystem 104 can be implemented at least in part on a baseband processor. The baseband processor can be an integrated circuit (IC) device (e.g., a Large Scale Integrated Circuit (LSI)) that performs communications functions. The baseband processor can include, for example, a Global System for Mobile Communications (GSM) modem. The baseband processor can be can be integrated with application processor 204 in a System-on-Chip (SoC).

Wireless subsystem 214 can be a component of mobile device 100 that is configured to send data to or receive data from wireless access point 230. Wireless access point 230 can be an access point in a Wi-Fi™, WiMAX™, or Bluetooth™ network. Wireless subsystem 214 can be implemented on a Wi-Fi™ chip. Exemplary operations of wireless subsystem 214 in configuring mobile device 100 will be described in further details below in reference to FIG. 3.

Exemplary Language Configuration

Figure 3:
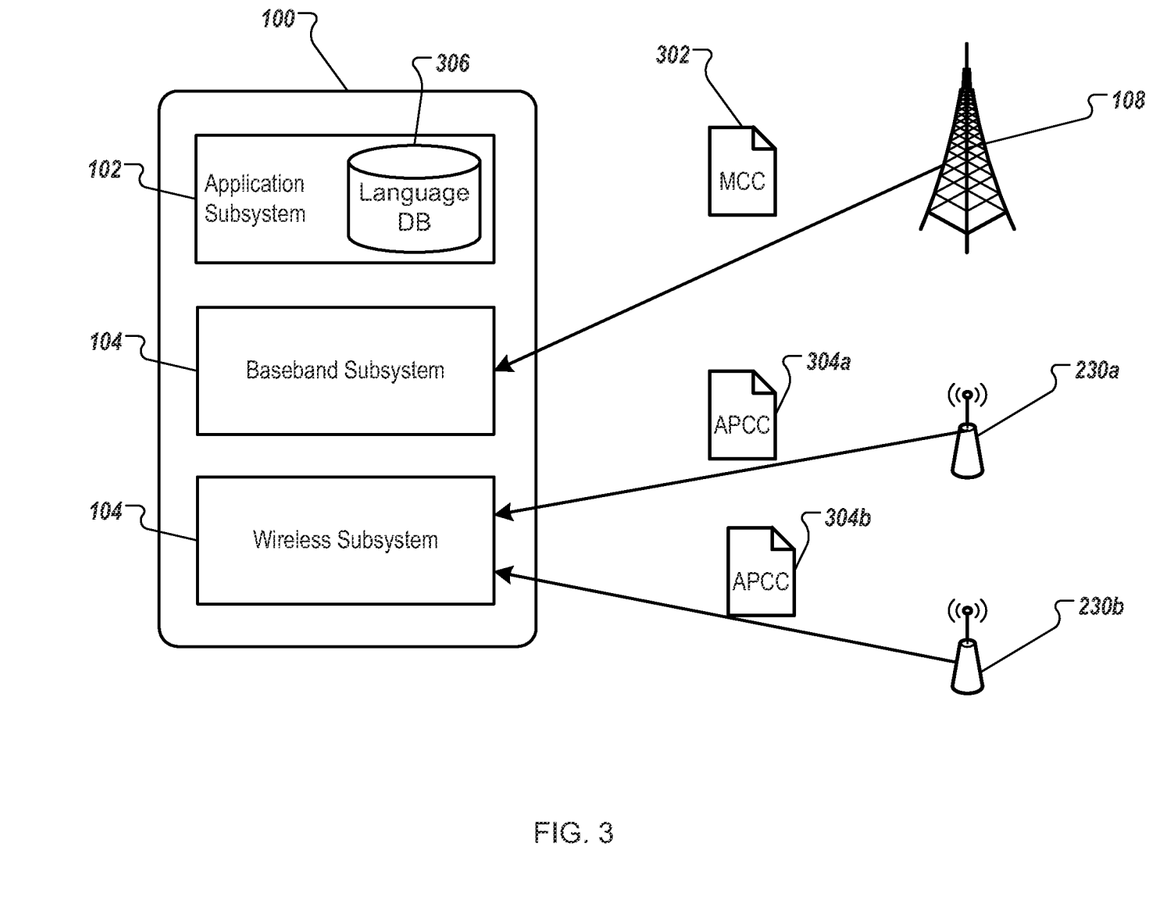
FIG. 3 is a block diagram illustrating exemplary techniques of automatic language selection.

FIG. 3 is a block diagram illustrating exemplary techniques of automatic language selection. During activation, mobile device 100 (as described in reference to FIGS. 1-2 above) can automatically designate a default language setting, or provide a limited number of language settings for a user to choose.

During activation, mobile device 100 can detect cell tower 108 using baseband subsystem 104. Upon detection of cell tower 108, mobile device 100 can receive mobile country code (MCC) 302 associated with cell tower 108. MCC 302 can indicate a country in which cell tower 108 is located.

Additionally or alternatively, mobile device 100 can detect wireless access devices 230a and 230b. Upon detection of wireless access device 230a or 230b, mobile device 100 can receive access point country code (APCC) 304a or 304b from wireless access device 230a or 230b, respectively. APCCs 304a and 304b each can indicate a country in which wireless access device 230a or 230b is located.

Mobile device 100 can use the received MCC or APCC as in index to search language data store 306. Language data store 306 can store a mapping between each MCC (or APCC)

and one or more countries, and each country and one or more languages. For example, language data store can store the information of table 1.

TABLE 1

Exemplary Country Code/Language Mapping

| MCC | Country | Language |
|---|---|---|
| 302 | Canada | English, French |
| 310-316 | United States of America | English, Spanish |
| 334 | Mexico | Spanish, Mayan, Nahuatl |

When a received MCC or APCC matches an entry in the country code/language mapping, mobile device 100 can select one of the languages in the mapping and designate the selected language as a default language setting of mobile device 100. In some implementations, mobile device 100 can provide for display multiple languages that correspond to a country code as selection items, such that a user can select from a limited number of languages to set up mobile device 100.

Exemplary Over-the-Air Configuration Processes

Figure 4:
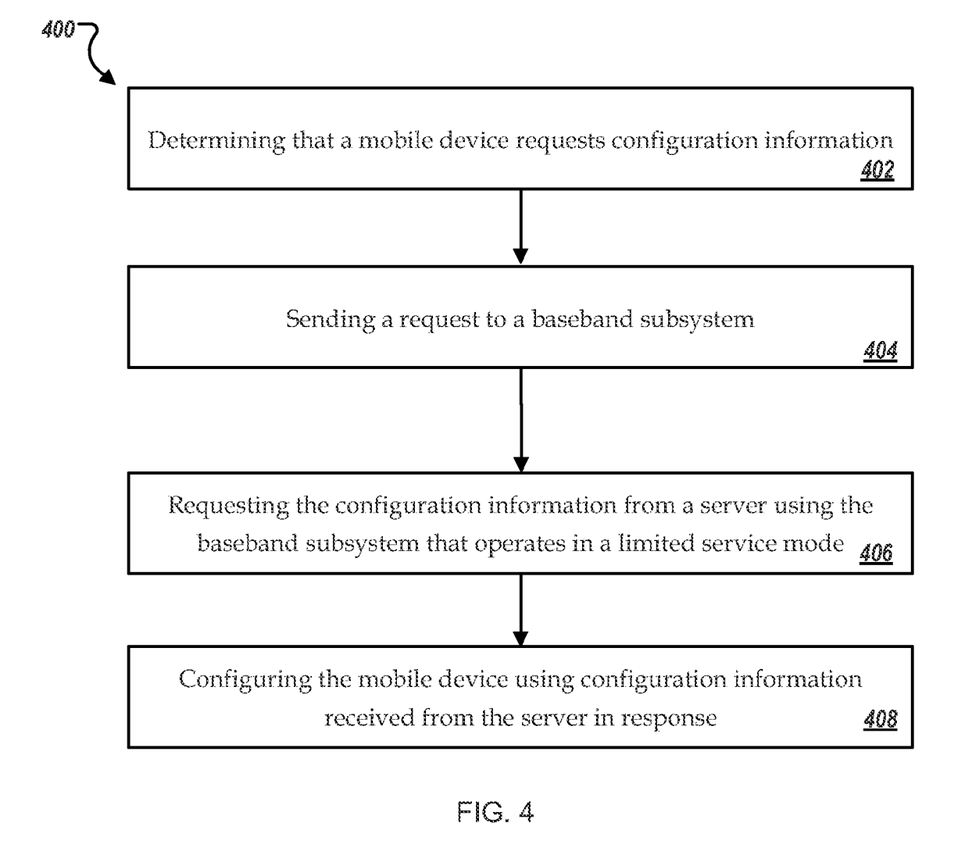
FIG. 4 is a flowchart of an exemplary process of over-the-air device configuration.

FIG. 4 is a flowchart of exemplary process 400 of over-the-air device configuration. The exemplary process can be implemented on mobile device as described above in reference to FIGS. 1-3.

Mobile device 100 can determine (402), using an application subsystem of mobile device 100, that mobile device 100 seeks configuration information. Mobile device 100 can determine that mobile device 100 seeks configuration information when mobile device 100 lacks configuration data. For example, when mobile device 100 is activated for a first time, when a baseband subsystem of mobile device 100 has not been previously configured to connect to a carrier.

In some implementations, upon or before determining that mobile device 100 requests configuration information, mobile device 100 can automatically determine a language setting of mobile device 100. Further details of determining the language setting will be described below in reference to FIG. 5.

Mobile device 100 can send (404), from the application subsystem, a request to the baseband subsystem of mobile device 100 for the configuration information. The request can include an indicator specifying that the baseband subsystem is to operate in a service configuration mode.

Mobile device 100 can request (406) the configuration information from a server using the baseband subsystem that operates in the service configuration mode. When the baseband subsystem operates in the service configuration mode, mobile device 100 can connect to the server through a specified carrier and under a specified data transfer limit. In some implementations, a time limit can be applied such that mobile device 100 can connect to the server only for a specified duration of time, regardless of amount of data transferred. When a connection has reached the time limit, mobile device 100 or the server can automatically terminate the connection. In some implementations, an address limit can be applied such that a connection is allowed only if an Internet Protocol (IP) address of mobile device 100 is within a specified IP address group. In some implementations, other restriction can be applied such that voice connections or circuit-switched connections are disallowed.

Requesting the configuration information from the server can include sending an identifier of mobile device 100 to the server through the specified carrier and a cellular network operated by the specified carrier. The configuration information requested from the server can include at least one of: (1) a device certificate for validating mobile device at various vendors; (2) a push token configuring the mobile device to receive a content push from a push server; or (3) an activation ticket specifying a cellular carrier for the baseband subsystem.

Mobile device 100 can configure (408) mobile device 100 using configuration information received from the server as a response to the request send in stage (406). Configuring mobile device 100 upon receiving the requested configuration information from the server can include configuring the baseband subsystem of mobile device 100 to connect to a carrier that is different from the specified carrier through which mobile device 100 connected to the registration server.

Figure 5:
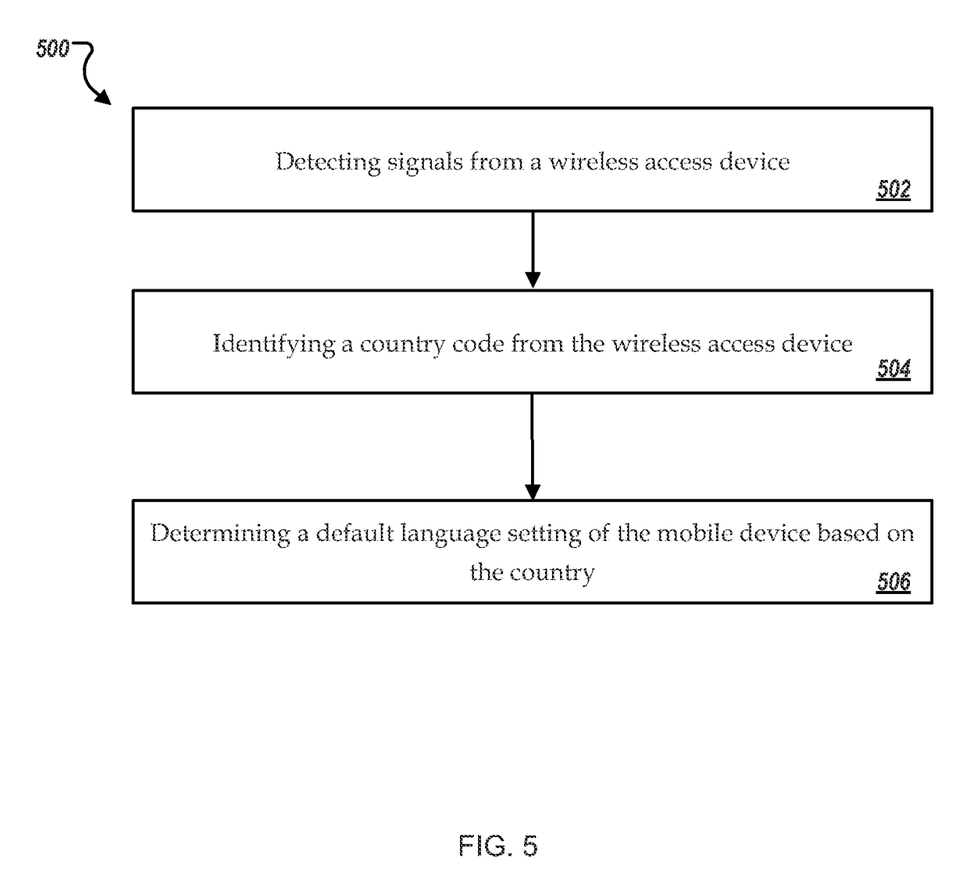
FIG. 5 is a flowchart of an exemplary process of automatic language selection.

FIG. 5 is a flowchart of exemplary process 500 of automatic language selection. Mobile device 100 (as described above in reference to FIGS. 1-4) can automatically determine a language setting of mobile device 100.

Mobile device 100 can detect (502) a signal from a wireless access device. The wireless access device can include at least one of a wireless access point or a cell tower. Mobile device 100 can identify (504) a country code from the wireless access device. The country code can identify a country in which the wireless access device is located. Mobile device can determine (506) a default language setting of the mobile device based on the country.

Exemplary User Interface

Figure 6:
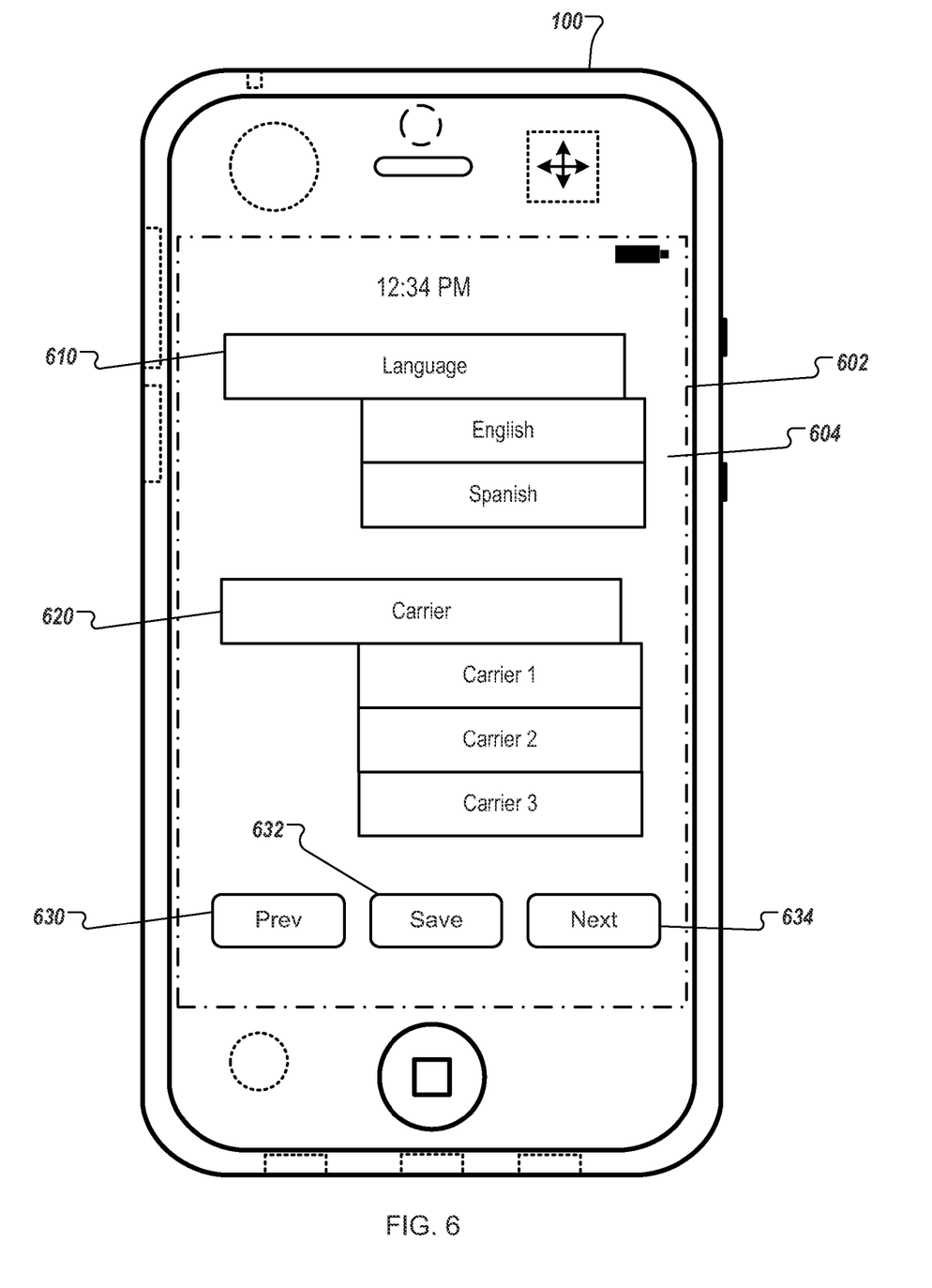
FIG. 6 illustrates an exemplary user interface of device configuration.

FIG. 6 illustrates an exemplary user interface of device configuration. The user interface will be described in reference to mobile device 100 as described above.

Mobile device 100 can include a touch-sensitive display device 602. Mobile device 100 can display configuration interface 604 of during activation of mobile device 100.

Configuration interface 604 can include language setting interface 610. Language setting interface 610 can include one or more language selections. The language selections can be determined by mobile device 100 using operations as described above in reference to FIGS. 3 and 5. Mobile device 100 can determine that multiple languages (e.g., English and Spanish) can apply. Accordingly, mobile device 100 can provide multiple language selections.

Configuration interface 604 can include language settings interface 610. Language settings interface 610 can include one or more language selections. The language selections can be determined by mobile device 100 using operations as described above in reference to FIGS. 3 and 5. Mobile device 100 can determine that multiple languages (e.g., English and Spanish) can apply. Accordingly, mobile device 100 can provide multiple language options in language settings interface 610.

Configuration interface 604 can include carrier settings interface 620. Carrier settings interface 620 can include one or more carrier selections. The carrier selections can be determined, for example, based on one or more carrier identifiers or certificates received from a configuration server. Mobile device 100 can configure a baseband subsystem to communicate with a selected carrier. The selected carrier can be independent from the carrier through which mobile device acquired the carrier identifiers or certificates.

Configuration interface 604 can include navigation controls 630, 632, and 634. Mobile device 100 can navigate to a previous screen in device activation, cancel current selections, or navigate to a next screen when mobile device receives an input from navigation control 630, 632, or 634, respectively.

Exemplary Mobile Device Architecture

Figure 7:
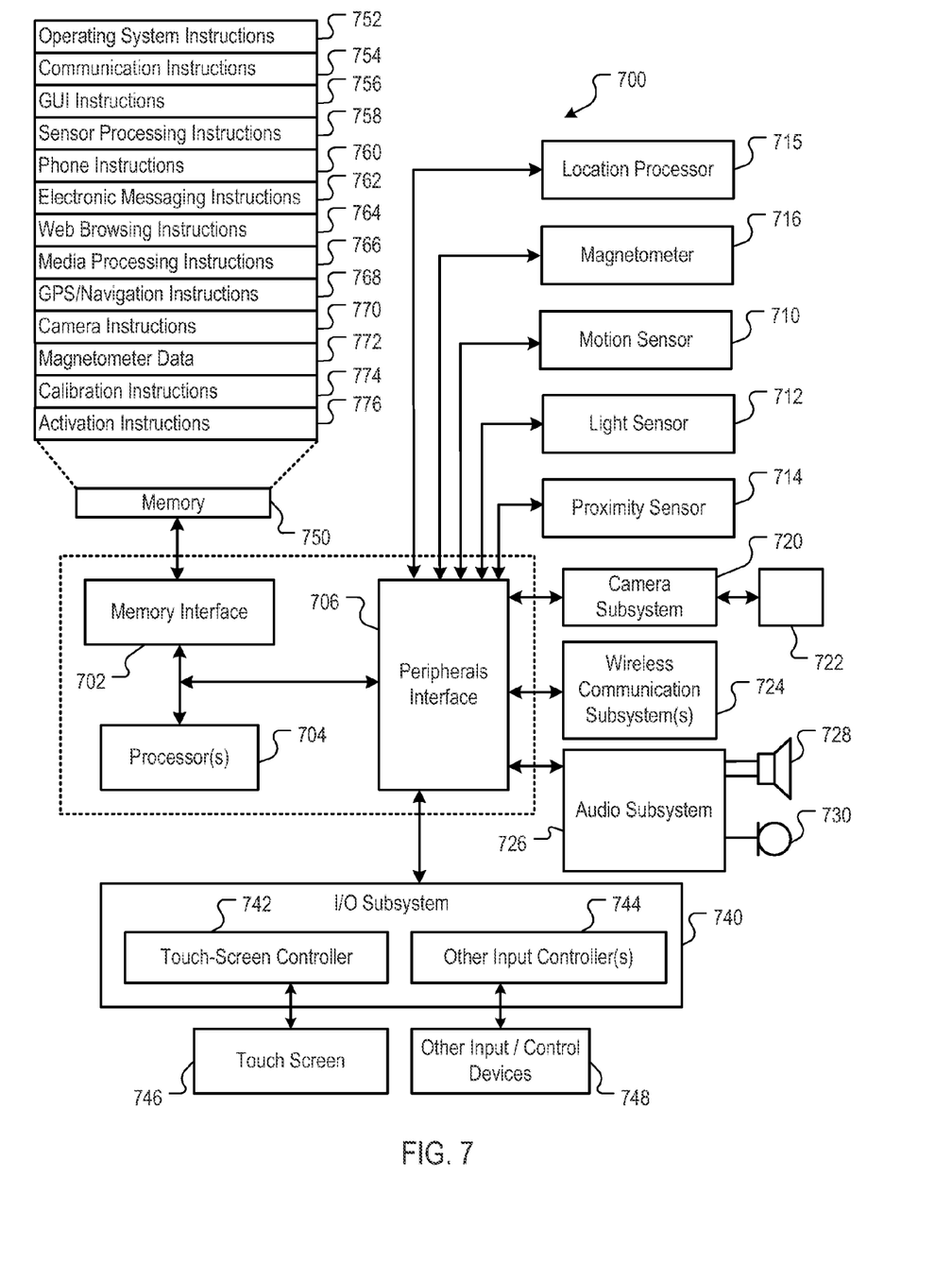
FIG. 7 is a block diagram illustrating an exemplary device architecture of a mobile device implementing the features and operations of FIGS. 1-6.

FIG. 7 is a block diagram illustrating an exemplary device architecture 700 of a mobile device implementing the features and operations of FIGS. 1-6.

The mobile device can include memory interface 702, one or more data processors, image processors and/or processors 704, and peripherals interface 706. Memory interface 702, one or more processors 704 and/or peripherals interface 706 can be separate components or can be integrated in one or more integrated circuits. Processors 704 can include one or more application processors (APs), one or more baseband processors (BPs), and/or one or more wireless processors. The application processors and baseband processors can be integrated in one single process chip. The various components in mobile device 100, for example, can be coupled by one or more communication buses or signal lines.

Sensors, devices, and subsystems can be coupled to peripherals interface 706 to facilitate multiple functionalities. For example, motion sensor 710, light sensor 712, and proximity sensor 714 can be coupled to peripherals interface 706 to facilitate orientation, lighting, and proximity functions of the mobile device. Location processor 715 (e.g., GPS receiver) can be connected to peripherals interface 706 to provide geopositioning. Electronic magnetometer 716 (e.g., an integrated circuit chip) can also be connected to peripherals interface 706 to provide data that can be used to determine the direction of magnetic North. Thus, electronic magnetometer 716 can be used as an electronic compass.

Camera subsystem 720 and an optical sensor 722, e.g., a charged coupled device (CCD) or a complementary metal-oxide semiconductor (CMOS) optical sensor, can be utilized to facilitate camera functions, such as recording photographs and video clips.

Communication functions can be facilitated through one or more wireless communication subsystems 724, which can include radio frequency receivers and transmitters and/or optical (e.g., infrared) receivers and transmitters. The specific design and implementation of the communication subsystem 724 can depend on the communication network(s) over which a mobile device is intended to operate. For example, a mobile device can include communication subsystems 724 designed to operate over a CDMA system, a Wi-Fi™ or WiMAX™ network, and a Bluetooth™ network. In particular, the wireless communication subsystems 724 can include hosting protocols such that the mobile device can be configured as a base station for other wireless devices.

Audio subsystem 726 can be coupled to a speaker 728 and a microphone 730 to facilitate voice-enabled functions, such as voice recognition, voice replication, digital recording, and telephony functions.

I/O subsystem 740 can include touch screen controller 742 and/or other input controller(s) 744. Touch-screen controller 742 can be coupled to a touch screen 746 or pad. Touch screen 746 and touch screen controller 742 can, for example, detect contact and movement or break thereof using any of a plurality of touch sensitivity technologies, including but not limited to capacitive, resistive, infrared, and surface acoustic wave technologies, as well as other proximity sensor arrays or other elements for determining one or more points of contact with touch screen 746.

Other input controller(s) 744 can be coupled to other input/control devices 748, such as one or more buttons, rocker switches, thumb-wheel, infrared port, USB port, and/or a pointer device such as a stylus. The one or more buttons (not shown) can include an up/down button for volume control of speaker 728 and/or microphone 730.

In one implementation, a pressing of the button for a first duration may disengage a lock of the touch screen 746; and a pressing of the button for a second duration that is longer than the first duration may turn power to mobile device 100 on or off. The user may be able to customize a functionality of one or more of the buttons. The touch screen 746 can, for example, also be used to implement virtual or soft buttons and/or a keyboard.

In some implementations, mobile device 100 can present recorded audio and/or video files, such as MP3, AAC, and MPEG files. In some implementations, mobile device 100 can include the functionality of an MP3 player. Mobile device 100 may, therefore, include a pin connector that is compatible with the MP3 player. Other input/output and control devices can also be used.

Memory interface 702 can be coupled to memory 750. Memory 750 can include high-speed random access memory and/or non-volatile memory, such as one or more magnetic disk storage devices, one or more optical storage devices, and/or flash memory (e.g., NAND, NOR). Memory 750 can store operating system 752, such as Darwin, RTXC, LINUX, UNIX, OS X, WINDOWS, or an embedded operating system such as VxWorks. Operating system 752 may include instructions for handling basic system services and for performing hardware dependent tasks. In some implementations, operating system 752 can include a kernel (e.g., UNIX kernel).

Memory 750 may also store communication instructions 754 to facilitate communicating with one or more additional devices, one or more computers and/or one or more servers. Memory 750 may include graphical user interface instructions 756 to facilitate graphic user interface processing; sensor processing instructions 758 to facilitate sensor-related processing and functions; phone instructions 760 to facilitate phone-related processes and functions; electronic messaging instructions 762 to facilitate electronic-messaging related processes and functions; web browsing instructions 764 to facilitate web browsing-related processes and functions; media processing instructions 766 to facilitate media processing-related processes and functions; GPS/Navigation instructions 768 to facilitate GPS and navigation-related processes and instructions; camera instructions 770 to facilitate camera-related processes and functions; magnetometer data 772 and calibration instructions 774 to facilitate magnetometer calibration. The memory 750 may also store other software instructions (not shown), such as security instructions, web video instructions to facilitate web video-related processes and functions, and/or web shopping instructions to facilitate web shopping-related processes and functions. In some implementations, the media processing instructions 766 can be divided into audio processing instructions and video processing instructions to facilitate audio processing-related processes and functions and video processing-related processes and functions, respectively. An activation record and International Mobile Equipment Identity (IMEI) or similar hardware identifier can also be stored in memory 750. Memory 750 can include activation instructions 776. Activation instructions 776 can be a computer program product that is configured to cause the mobile device to set a baseband subsystem to operate in a service configuration mode and request configuration information from a registration server through a specified carrier. Activation instructions 776 can cause the mobile device to configure the mobile device using the configuration information, and to automatically determine a language setting.

Each of the above identified instructions and applications can correspond to a set of instructions for performing one or more functions described above. These instructions need not be implemented as separate software programs, procedures, or modules. Memory 750 can include additional instructions or fewer instructions. Furthermore, various functions of the mobile device may be implemented in hardware and/or in software, including in one or more signal processing and/or application specific integrated circuits.

Exemplary Operating Environment

Figure 8:
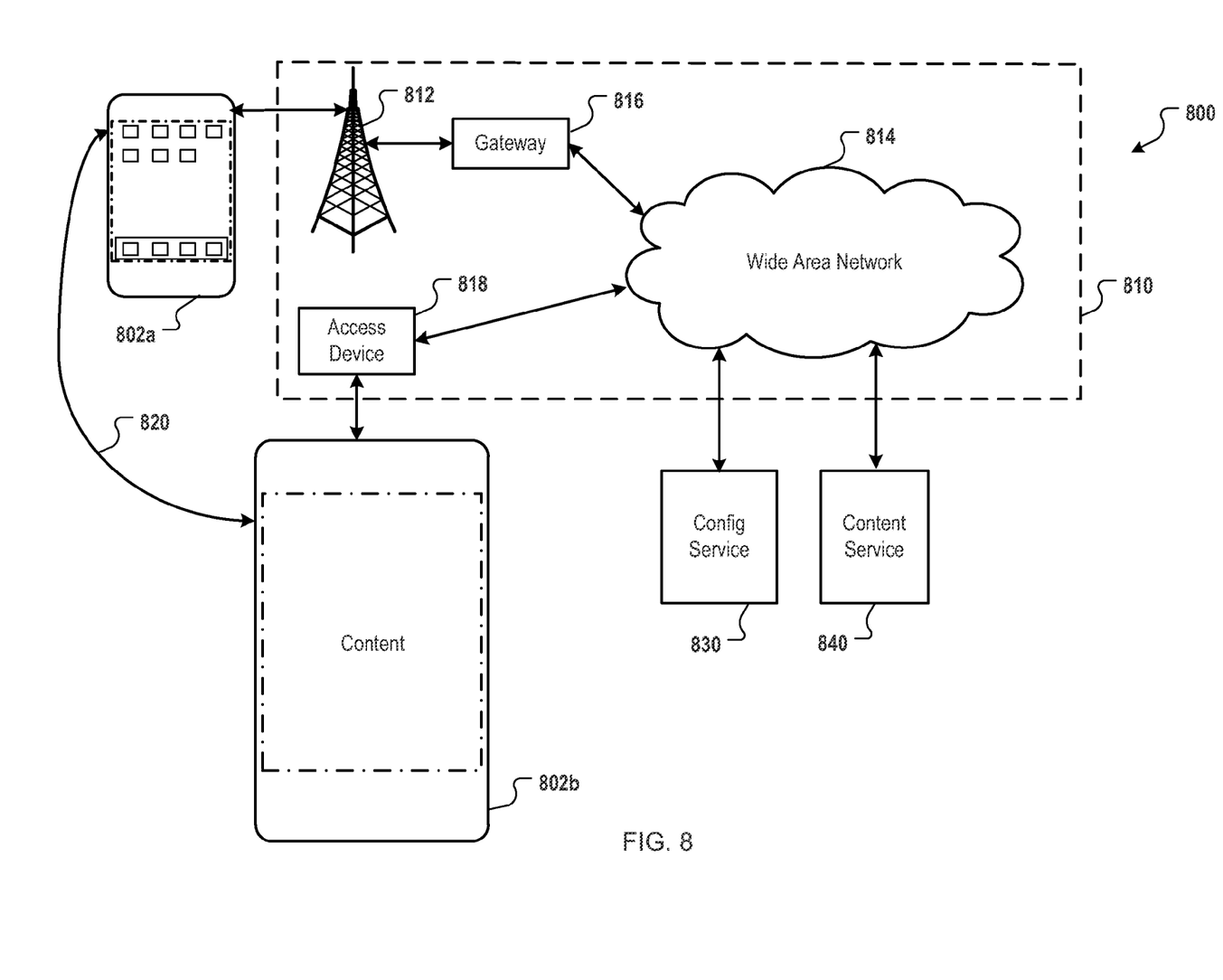
FIG. 8 is a block diagram of exemplary network operating environment for mobile devices of FIG. 1-7.

FIG. 8 is a block diagram of exemplary network operating environment 800 for the mobile devices of FIG. 1-6. Mobile devices 802a and 802b can, for example, communicate over one or more wired and/or wireless networks 810 in data communication. For example, a wireless network 812, e.g., a cellular network, can communicate with a wide area network (WAN) 814, such as the Internet, by use of a gateway 816. Likewise, an access device 818, such as an 802.11g wireless access device, can provide communication access to the wide area network 814.

In some implementations, both voice and data communications can be established over wireless network 812 and the access device 818. For example, mobile device 802a can place and receive phone calls (e.g., using voice over Internet Protocol (VoIP) protocols), send and receive e-mail messages (e.g., using Post Office Protocol 3 (POP3)), and retrieve electronic documents and/or streams, such as web pages, photographs, and videos, over wireless network 812, gateway 816, and wide area network 814 (e.g., using Transmission Control Protocol/Internet Protocol (TCP/IP) or User Datagram Protocol (UDP)). Likewise, in some implementations, the mobile device 802b can place and receive phone calls, send and receive e-mail messages, and retrieve electronic documents over the access device 818 and the wide area network 814. In some implementations, mobile device 802a or 802b can be physically connected to the access device 818 using one or more cables and the access device 818 can be a personal computer. In this configuration, mobile device 802a or 802b can be referred to as a "tethered" device.

Mobile devices 802a and 802b can also establish communications by other means. For example, wireless mobile device 802a can communicate with other wireless devices, e.g., other mobile devices 802a or 802b, cell phones, etc., over the wireless network 812. Likewise, mobile devices 802a and 802b can establish peer-to-peer communications 820, e.g., a personal area network, by use of one or more communication subsystems, such as the Bluetooth™ communication devices. Other communication protocols and topologies can also be implemented.

The mobile device 802a or 802b can, for example, communicate with one or more services 830 and 840 over the one or more wired and/or wireless networks. For example, one or more registration services 830 can be used to receive registration requests from mobile devices 802a and 802b. The requests can include identifiers of mobile devices 802a and 802b. In response, registration services 830 can provide configuration information to mobile devices 802a and 802b, including one or more certificates. Content services 840 can be configured to receive authentication requests from mobile devices 802a and 802b and authenticate mobile devices 802a and 802b using one or more certificates (e.g., the certificates received from registration services 830).

Mobile device 802a or 802b can also access other data and content over the one or more wired and/or wireless networks. For example, content publishers, such as news sites, Rally Simple Syndication (RSS) feeds, web sites, blogs, social networking sites, developer networks, etc., can be accessed by mobile device 802a or 802b. Such access can be provided by invocation of a web browsing function or application (e.g., a browser) in response to a user touching, for example, a Web object.

A number of implementations of the invention have been described. Nevertheless, it will be understood that various modifications can be made without departing from the spirit and scope of the invention.

What is claimed is:

1. A method performed by a mobile device, comprising:
determining, in an application subsystem of the mobile device, that the mobile device seeks configuration information;
from the application subsystem, sending a request to a baseband subsystem of the mobile device, the request including an indicator specifying that the baseband subsystem is to operate in a service configuration mode, wherein, when operating in the service confiuration mode, the baseband system connects to a cellular network to access a server on the cellular network for requesting the configuration information, wherein the baseband system connects to the cellular network despite the mobile device being unknown to a carrier that provides the cellular network;
requesting the configuration information from the server using the baseband subsystem in the service configuration mode; and
configuring the mobile device using configuration information received from the server in response.

2. The method of claim 1, wherein the baseband subsystem has not been previously configured to connect to a carrier.

3. The method of claim 1, comprising:
before determining that the mobile device requests configuration information, automatically determining a language setting of the mobile device.

4. The method of claim 3, wherein determining the language setting of the mobile device includes:
detecting signals from a wireless access device;
identifying a country code from the wireless access device, the country code operable to identify a country in which the wireless access device is located; and
determining a default language setting of the mobile device based on the country.

5. The method of claim 4, wherein the wireless access device is at least one of a wireless access point or a cell tower.

6. The method of claim 1, wherein configuring the mobile device upon receiving the requested configuration information from the server comprises configuring the baseband subsystem to connect to a carrier that is different from the specified carrier.

7. The method of claim 1, wherein:
requesting the configuration information from the server includes sending an identifier of the mobile device to the server through the specified carrier and a cellular network operated by the specified carrier; and
the configuration information requested from the server includes at least one of:
a device certificate for validating the mobile device;
a push token configuring the mobile device to receive a push from a push server; or
an activation ticket specifying a cellular carrier for the baseband subsystem.

8. The method of claim 1, wherein connecting to the server is subject to a time or address limit.

9. The method of claim 1, wherein the method further comprises:
   from the application subsystem, determining that a wired connection or an open connection to a wireless access point is not available for requesting configuration information from a server;
   upon determining that the wired connection or the open connection to the wireless access point is not available, performing the sending, requesting, and configuring operations.

10. The method of claim 1, wherein the baseband system accesses the cellular network under a data transfer limitation.

11. A computer program product stored on a non-transitory storage device, the product configured to cause a mobile device to perform operations comprising:
   determining, in an application subsystem of the mobile device, that the mobile device seeks configuration information;
   from the application subsystem, sending a request to a baseband subsystem of the mobile device, the request including an indicator specifying that the baseband subsystem is to operate in a service configuration mode, wherein, when operating in the service configuration mode, the baseband system connects to a cellular network to access a server on the cellular network for requesting the configuration information, wherein the baseband system connects to the cellular network despite the mobile device being unknown to a carrier that provides the cellular network;
   requesting the configuration information from a server using the baseband subsystem in the service configuration mode; and
   configuring the mobile device using configuration information received from the server in response.

12. The product of claim 11, wherein the baseband subsystem has not been previously configured to connect to a carrier.

13. The product of claim 11, the operations comprising:
   before determining that the mobile device requests configuration information, automatically determining a language setting of the mobile device.

14. The product of claim 13, wherein determining the language setting of the mobile device includes:
   detecting signals from a wireless access device;
   identifying a country code from the wireless access device, the country code operable to identify a country in which the wireless access device is located; and
   determining a default language setting of the mobile device based on the country.

15. The product of claim 14, wherein the wireless access device is at least one of a wireless access point or a cell tower.

16. The product of claim 11, wherein configuring the mobile device upon receiving the requested configuration information from the server comprises configuring the baseband subsystem to connect to a carrier that is different from the specified carrier.

17. The product of claim 11, wherein:
   requesting the configuration information from the server includes sending an identifier of the mobile device to the server through the specified carrier and a cellular network operated by the specified carrier; and
   the configuration information requested from the server includes at least one of:
   a device certificate for validating the mobile device;
   a push token configuring the mobile device to receive a push from a push server; or
   an activation ticket specifying a cellular carrier for the baseband subsystem.

18. The product of claim 11, wherein connecting to the server is subject to a time or address limit.

19. The product of claim 11, wherein the baseband system accesses the cellular network under a data transfer limitation.

20. A system comprising:
   a mobile device configured to perform operations comprising:
   determining, in an application subsystem of the mobile device, that t e mobile device seeks configuration information;
   from the application subsystem, sending a request to a baseband subsystem of the mobile device, the request including an indicator specifying that the baseband subsystem is to operate in a service configuration mode, wherein, when operating in the service configuration mode, the baseband system connects to a cellular network to access a server on the cellular network the requesting the configuration information, wherein the baseband system connects to the cellular network despite the mobile device being unknown to a carrier that provides the cellular network;
   requesting the configuration information from a server using the baseband subsystem in the service configuration mode; and
   configuring the mobile device using configuration information received from the server in response.

21. The system of claim 20, wherein the baseband subsystem has not been previously configured to connect to a carrier.

22. The system of claim 20, the operations comprising:
   before determining that the mobile device requests configuration information, automatically determining a language setting of the mobile device.

23. The system of claim 22, wherein determining the language setting of the mobile device includes:
   detecting signals from a wireless access device;
   identifying a country code from the wireless access device, the country code operable to identify a country in which the wireless access device is located; and
   determining a default language setting of the mobile device based on the country.

24. The system of claim 20, wherein configuring the mobile device upon receiving the requested configuration information from the server comprises configuring the baseband subsystem to connect to a carrier that is different from the specified carrier.

25. The system of claim 20, wherein:
   requesting the configuration information from the server includes sending an identifier of the mobile device to the server through the specified carrier and a cellular network operated by the specified carrier; and
   the configuration information requested from the server includes at least one of:
   a device certificate for validating the mobile device;
   a push token configuring the mobile device to receive a push from a push server; or
   an activation ticket specifying a cellular carrier for the baseband subsystem.

26. The system of claim 20, wherein connecting to the server is subject to a time or address limit.

27. The system of claim 20, wherein the baseband system accesses the cellular network under a data transfer limitation.

28. The system of claim 23, wherein the wireless access device is at least one of a wireless access point or a cell tower.

* * * * *